Patented Oct. 19, 1937

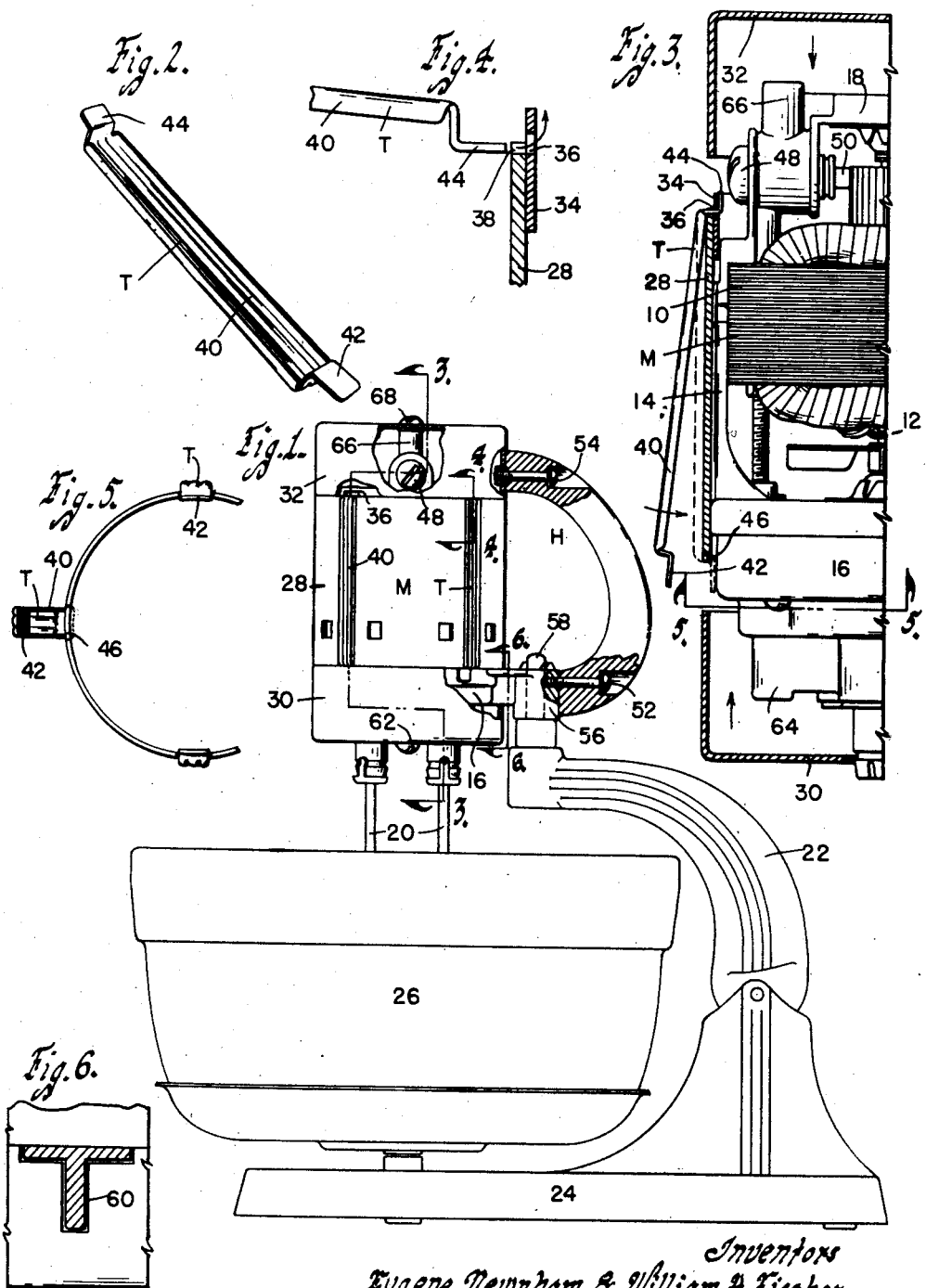

2,096,618

UNITED STATES PATENT OFFICE 2,096,618

MOTOR AND HOUSING ASSEMBLY

Eugene Newnham and William H. Fischer, St. Louis, Mo., assignor to Knapp-Monarch Company, St. Louis, Mo., a corporation of Missouri Application March 2, 1937, Serial No. 128,620

14 Claims. (Cl. 171—252)

An object of our invention is to provide a housing for a motor, the housing being comparatively simple and inexpensive from a manufacturing standpoint.

Still a further object is to provide a housing comprising a shell and a pair of end caps, and to connect the end caps and position them relative to the casing in a novel manner.

Still another object is to provide trim elements associated with the shell and end caps, which are so designed that they serve the purpose of positioning one of the end caps while at the same time such end cap serves to retain the trim elements in their assembled position.

More particularly it is our object to provide a shell and end caps constituting a housing for a motor and to provide trim elements which extend along the exterior of the shell and have offset ends extending over the edges of the shell and terminating within the end caps.

With these and other objects in view, our invention consists in the construction, arrangement and combination of the various parts of our motor and housing assembly, whereby the objects contemplated are attained, as hereinafter more fully set forth, pointed out in our claims, and illustrated in the accompanying drawing, in which:

Figure 1 is a side elevation of a food mixer showing our motor and housing assembly used in connection therewith.

Figure 2 is a perspective view of a trim element constituting a part of our housing assembly.

Figure 3 is an enlarged sectional view on the line 3—3 of Figure 1, showing the parts being assembled.

Figure 4 is an enlarged sectional view on the line 4—4 of Figure 1, showing one of the initial steps or assembling our housing.

Figure 5 is a sectional view on the line 5—5 of Figure 3, showing how portions of our assembly are associated relative to each other; and Figure 6 is a sectional view on the line 6—6 of Figure 1.

On the accompanying drawing, we have used the reference character M to indicate generally a motor. The motor M is of usual construction comprising field laminations 10, an armature 12, a frame 14 and end heads 16 and 18. The end heads 16 contain suitable gearing for operating a pair of mixer shafts 20 when the motor is used for a food mixer, such food mixer being shown in the drawing merely by way of example.

The food mixer is illustrated as having a supporting arm 22 for the motor M, the supporting arm being pivoted to a base 24 and the mixing bowl of the mixer being shown at 26.

A housing is provided for the motor M comprising a tubular shell 28 and end caps 30 and 32. Within the upper end of the shell 28 an annular flange 34 is provided having a series of circumferentially spaced slots 36. The upper edge of the shell has a plurality of circumferentially spaced notches 38 corresponding to the slots 36.

Trim elements T are provided having longitudinally extending portions 40 and offset ends 42 and 44. These elements are assembled relative to the shell 28 by first extending the offset ends 44 through the notches 38 and the slots 36 as shown in Figure 4, and then swinging the trim elements T downwardly as in Figure 3. The trim elements are then swung from the full line position to the dotted position of Figure 3, which places them under tension. During such swinging movement, the offset ends 42 enter notches 46 in the lower edge of the shell 28 and the offset ends are then within the outline of the shell. Thereupon the cap 30 may be placed in position, while the trim elements T are held in their dotted position, and will be positioned relative to the shell by the offset ends 42. At the same time the end cap 30 will retain the trim elements T against movement from their assembled position.

The offset ends 44 could be similarly held in position by the end cap 32, but it is sometimes desirable to remove this end cap in order to remove the brush retainers 48 of the motor M, so that the brushes 50 thereof can be repaired or replaced. Accordingly we provide the annular flange 34 to retain the offset ends 44 against displacement, and this flange serves to position the end cap 32.

A handle H is provided for supporting the motor and housing assembly by hand. This handle is secured as by screws 52 and 54 to an extension 56, and the upper end cap 32 respectively. The extension 56 is designed for positioning on a pin 58 extending upwardly from the supporting arm 42 and extends from the lower motor head 16. The lower end cap 30 is notched as indicated at 60 to provide for the extension 56.

The trim elements T enhance the appearance of the motor and serve to position the end cap 30, thus eliminating the necessity of having to provide a shoulder or some other positioning means. The cap 30 cooperates with the trim elements to retain them in position after the cap has been placed in position and secured by screws 62, which extend into bosses 64 extending from the motor head 16. Likewise the motor head 18 is provided with bosses 66 to receive screws 68 to retain the end cap 32 in position.

Some changes may be made in the construction and arrangement of the parts of our motor and housing assembly without departing from the real spirit and purpose of our invention, and it is our intention to cover by our claims any modified forms of structure or use of mechanical equivalents which may be reasonably included within their scope.

We claim as our invention:

1. In a device of the class described, a motor, a shell and end caps constituting a housing therefor and trim elements extending along the exterior of said shell and having offset ends extending across the end edges of said shell and to a position within said end caps.

2. In a device of the class described, a motor, a shell and end caps constituting a housing therefor and trim elements extending along the exterior of said shell and having offset ends extending across the end edges of said shell and to a position within said end caps, said shell having its ends notched to receive said offset ends.

3. In a device of the class described, a motor, a housing therefor, said housing including a shell and an end cap and positioning means for said end cap comprising a plurality of elements engaging the exterior of said shell and having offset ends extending over the end edges of the shell, said cap being positioned by said offset ends and means to secure said cap to said motor.

4. In a device of the class described, a motor, a housing therefor, said housing including a shell and an end cap and positioning means for said end cap comprising a plurality of elements engaging the exterior of said shell and having offset ends, an end of said shell being notched at a plurality of circumferentially spaced positions, one of said offset ends extending through said notches and having projecting portions engaging the interior of said cap in position it relative to said shell and means for securing said cap to said motor.

5. In an assembly of the character disclosed, a motor, a housing therefor, said housing comprising a tubular shell and end caps and means associated with said shell and end caps to position one of the end caps, said means comprising elongated elements extending along the exterior of said shell and having terminal ends within said end caps.

6. In an assembly of the character disclosed, a motor, a housing therefor, said housing comprising a shell and end caps, one end of said shell having circumferentially spaced slots and means associated with said shell and end caps to position one of the end caps, said means comprising elongated elements extending along the exterior of said shell and having terminal ends, some of which extend into said slots and the rest of which extend to a position within one of said end caps.

7. In an assembly of the character disclosed, a motor, a housing therefor, said housing comprising a shell and end caps and trim elements associated with said shell and end caps, said trim elements extending along the exterior of said shell and having its terminal ends offset and positioned within said caps.

8. In an assembly of the character disclosed, a motor, a housing therefor, said housing comprising a shell and end caps and trim elements associated with said shell and end caps, said trim elements extending along the exterior of said shell and having their terminal ends offset and positioned within said caps, said terminal ends being operable to position one of said end caps relative to the end of said shell on which said cap is mounted.

9. In a motor and housing assembly, a motor having end heads, a housing therefor comprising a shell and a pair of end caps, and a handle for said motor and housing, one of said motor heads having an extension therefrom, the cap associated with one end of said shell being notched to clear said projection and a pair of fastening elements through said handle, one of said fastening elements being connected with said extension and the other of said fastening elements being connected with the other end cap.

10. In a motor and housing assembly, a motor and heads thereon, a housing for said motor and end heads comprising a shell and a pair of end caps, a handle for said motor and housing, one of said motor heads having an extension and a pair of fastening elements through said handle, one of said fastening elements being connected with said extension and the other of said fastening elements being connected with the other end cap.

11. In an assembly of the character disclosed, a motor, a housing therefor, said housing comprising a cylindrical shell and end caps and elongated elements arranged longitudinally along the outside of said shell and spaced circumferentially therearound, said elongated elements having their terminal ends offset and positioned within said caps, said terminal ends being operable to position one of said end caps relative to the end of said shell on which said cap is mounted.

12. In an assembly of the character disclosed, a motor, a housing therefor, said housing comprising a shell and end caps, one end of said shell having circumferentially spaced slots and trim elements associated with said shell and end caps, said trim elements each having one of its terminal ends extended into said slots and the other of its terminal ends extended to a position within one of said end caps.

13. In a device of the class described, a motor, a shell and an end cap thereon for housing said motor and trim elements extending along the exterior of said shell and having offset ends extending across the end edge of said shell and to a position within said end cap, said shell having said end notched to receive said offset ends.

14. In a device of the class described, a motor, a shell and an end cap for housing said motor and positioning means for said end cap comprising a plurality of elements engaging the exterior of said shell and having offset ends extending over the end edges of the shell, said cap being positioned by said offset ends and serving to retain them in assembled position and means to secure said cap to said motor.

EUGENE NEWNHAM.
WILLIAM H. FISCHER.